INVENTOR.
John M. Doyle
BY Garth A. Rowls
Their Attorney

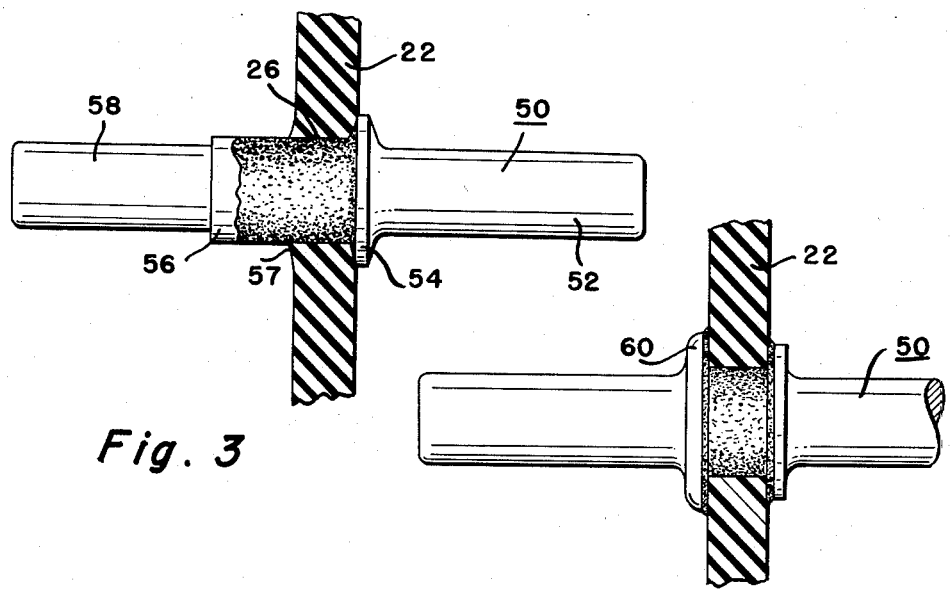
Fig. 3
Fig. 4
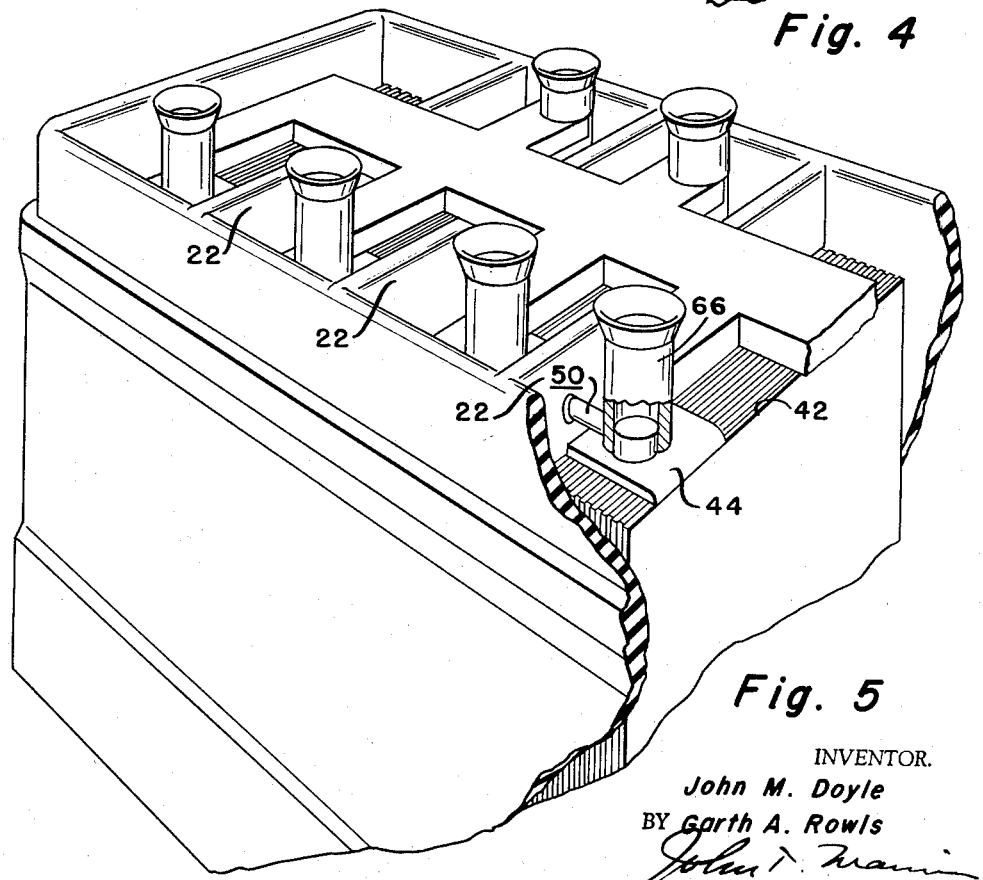
Fig. 5
INVENTOR.
John M. Doyle
BY Garth A. Rowls
Their Attorney

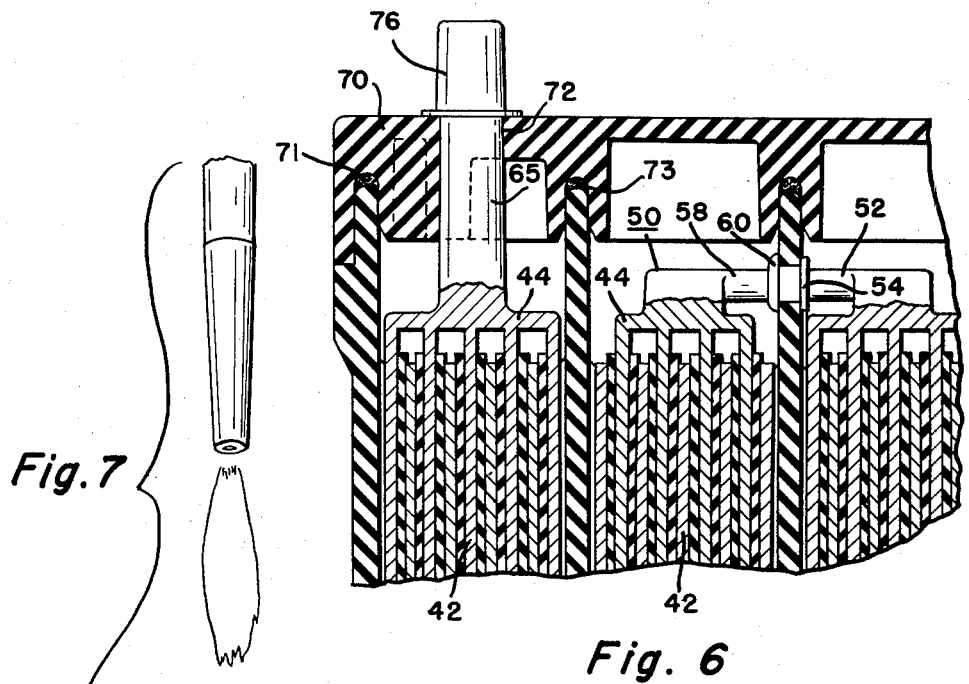
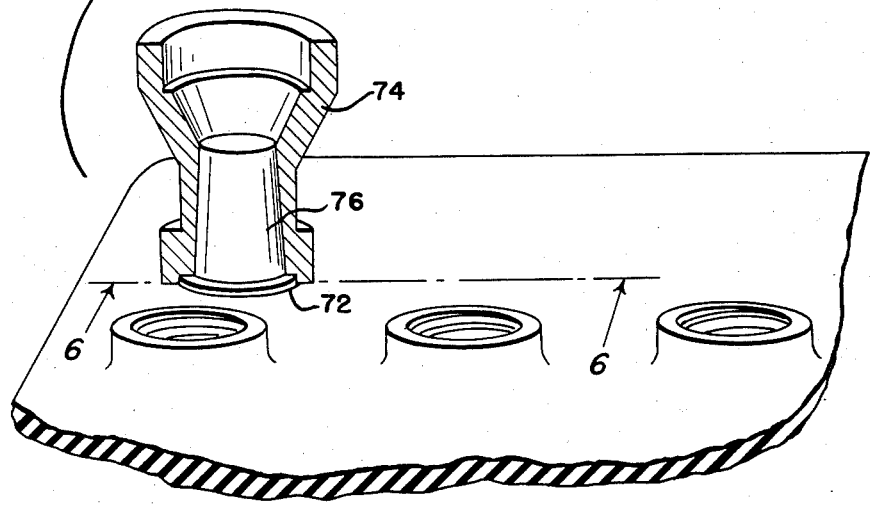
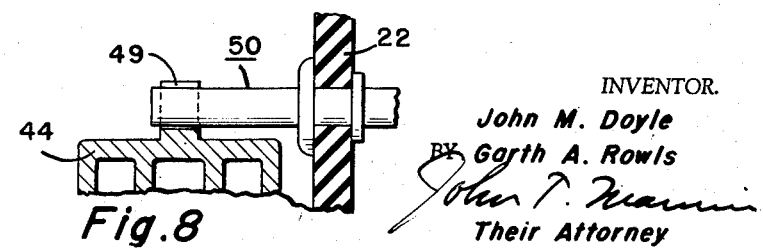
INVENTOR.
John M. Doyle
Garth A. Rowls
Their Attorney United States Patent Office 2,942,059
Patented June 21, 1960

2,942,059
METHOD FOR MAKING STORAGE BATTERIES

John M. Doyle, Anderson, and Garth A. Rowls, Muncie, Ind., assignors to General Motors Corporation, Detroit, Mich., a corporation of Delaware Filed Aug. 12, 1957, Ser. No. 677,652

5 Claims. (Cl. 136—176)

This invention relates to storage batteries and is particularly concerned with a method and apparatus for making a storage battery.

It is, therefore, one of the objects of the invention to provide a method for making a storage battery wherein assembly operations are simplified and wherein a highly satisfactory battery may be formed at a reduced cost.

In carrying out this object, it is a further object of the invention to utilize a molded battery case having integral partitions therein which case is open at the top thereof, perforating the partitions after manufacture of the battery case, assembling battery elements in the several cell compartments formed by said partitions, passing cell connector elements through the partition perforations, deforming the connector elements so as to permanently associate them with the battery case and form a fluid tight connection between the elements of the several partitions and finally casting electrical connections between the connectors and the battery elements whereby an integrated assembly is obtained and wherein the connector elements are within the cells, and are not visible from the top of the battery when a battery cover is finally put in place.

In some cases, it is found desirable to coat the connector elements with a specific sealing compound which helps form the fluid seal and which bonds the lead or lead alloy connector to the battery case compound.

Another object of the invention is to provide a method for assembling a storage battery wherein a molded storage battery case having integrally molded partitions therein is provided, perforating each partition with a click punch to form an aperture therein through which a battery element connector may be passed and, in deforming the connector, form opposite sides of the partition for permanently associating the connector with the battery case and for forming a fluid tight connection between the connector element and the partition.

Further objects and advantages of the present invention will be apparent from the following description, reference being had to the accompanying drawings wherein preferred embodiments of the present invention are clearly shown.

In the drawings:

Figure 3 is a sectional view taken through one of the partition walls showing a cell connector element in place.

Figure 4 is a sectional view similar to Figure 3 after the connector element has been upset to form a fluid tight seal between the element and the partition.

Figure 5 is a view in perspective showing the method used to integrally cast connections between the connector elements and the battery element plate straps.

Figure 6 is a cut-away fragmentary view showing the battery with the cover in place; and Figure 7 is a partial view in perspective showing the procedure used to cast on the terminal posts of the battery.

Figure 8 shows an alternative means of interconnecting the several cell groups.

Figures 1, 2:
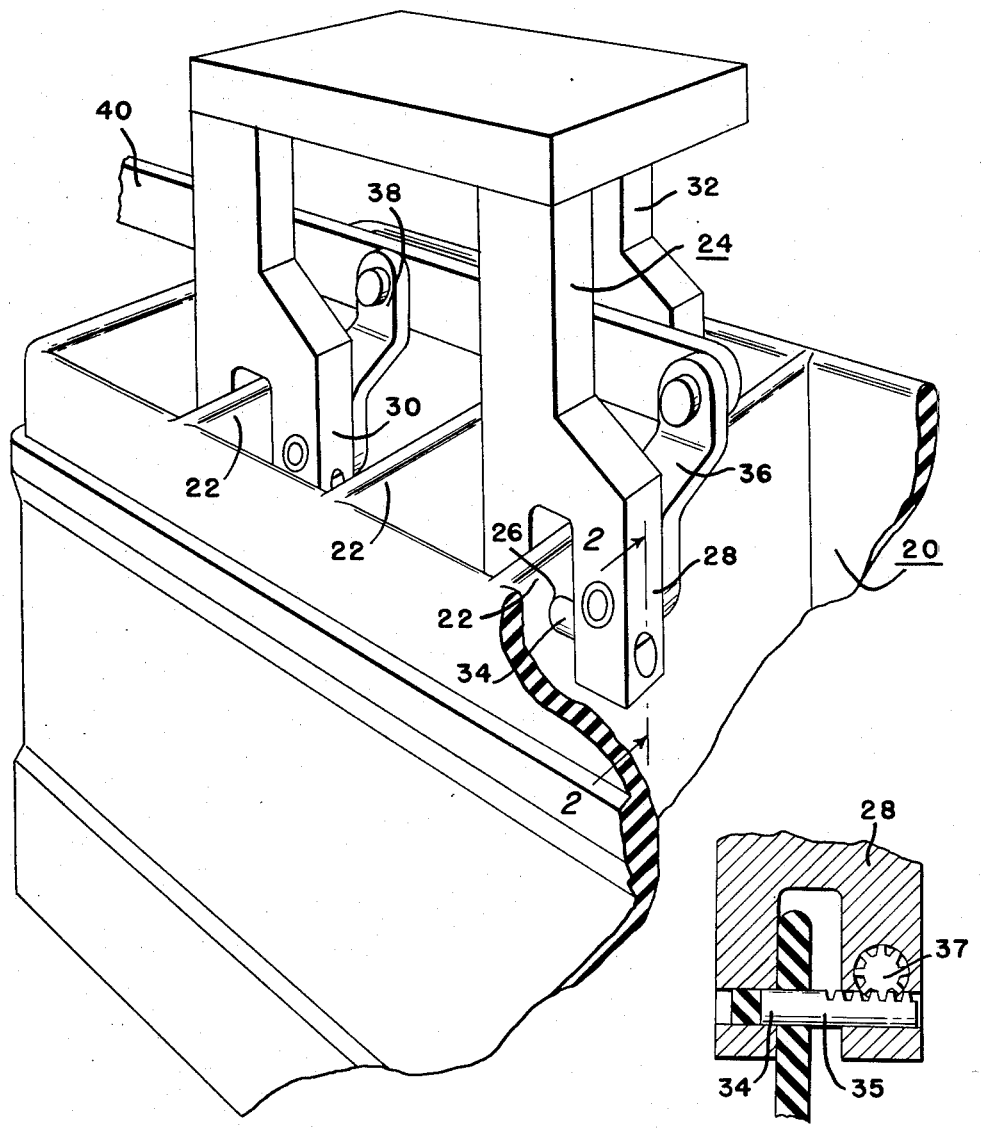
Figure 1 is a view in perspective showing a three-cell battery case with a click punch in position for perforating simultaneously the three partitions.
Figure 2 is a section taken on line 2—2 of Figure 1.

This invention is filed concurrently with our application, S.N. 677,738, which is specifically directed to the battery whereas the present application is mainly concerned with methods used in the manufacture of the battery.

In the manufacture of storage batteries, it is usual practice to provide a partitioned battery case and to then assembly battery elements or cell groups therein which have upwardly extending terminals that extend through a cover which is subsequently placed on top of the battery case. These terminals are then connected in series externally of the battery case and on top of the cover by connector elements which are burned or welded into place so as to electrically connect them with the terminals. While this method of assembly has been quite satisfactory, it has admitted drawbacks in that the exposed connector elements tend to corrode or "sulfate" and create many problems which would not be present were the connector elements maintained substantially out of contact with the air. These problems are aggravated when using 12 and 24-volt batteries. Furthermore, the usual method for making electrical connections requires long lead or lead alloy posts on each terminal of each battery cell or element which are costly and which add to the over-all weight of the battery.

The present invention is directed to a novel method of assembling a battery wherein all external connections are eliminated and wherein the battery elements for each cell are permanently associated with connector elements which pass through the partitions of the battery case and are maintained substantially out of contact with the atmosphere. This is accomplished by utilizing a battery case 20 of conventional design with partitions 22 between the several cells. These partitions are integrally molded with the case, are click-punched simultaneously by means of a punch 24 to provide a plurality of apertures 26 through the partition walls.

The click punch 24, in one form, has three dependent bifurcated arms 28, 30 and 32 each of which carries a punch member 34. The punches are all cam operated as shown in Figure 2 by a rack 35 and pinion 37 through levers 36 and 38 which are attached to a pull bar, or actuator, 40. The bifurcated portions of the arms 28, 30 and 32 are dimensioned so as to properly straddle the partitions 22 and then, by actuating the pull bar 40, all partitions, may be punched simultaneously to provide apertures 26 therein. It is apparent that the same apparatus, slightly modified, and procedure may be used with four or six cell batteries, etc.

In this connection, it is preferable to punch or perforate the partitions shortly after the battery case compound has been cured since this compound, upon aging, becomes more hard and brittle than it is immediately after the curing or vulcanizing operation. Conventional battery case compounds are well known in the art and are disclosed in copending application, Serial No. 615,744, now Patent No. 2,883,358, assigned to the assignee of the present invention. In any event, it is preferable to carry out the perforating or punching operation within a few hours after the curing is complete although this is not necessarily a limitation since, even after age hardening, the partitions may be satisfactorily punched although there is a tendency for the partitions to chip around the aperture in the exit side of the punch 34.

After the apertures 26 have been provided in the several partitions, battery elements or cell groups 42 are placed in each cell compartment. Each of these cell groups comprise a plurality of positive and negative plates having suitable separators therebetween. Each cell group also includes two connector straps 44 of opposite polarity thereon. These connector straps are flat and are respectively burned or welded to extensions on the several positive and negative plates of each element or cell group so as to electrically connect all of the plates of one polarity in conventional manner (see Figure 6). The straps 44 are positioned so as to be in substantial alignment with the perforations 26 in each cell compartment. After the battery elements 42 are in place, connector elements 50, as noted in Figure 3, are forced through the apertures 26. The connector elements 50 may be of any suitable design and one of these designs comprises a rod 52 having a shoulder 54 thereon with two concentric cylindrical portions 56 and 58 extending from one side of the flange 54 and of progressively less diameter. Extension 56 is made to be a substantial line-to-line fit with the aperture 26 so that, when the connector element 50 is forced through the aperture or perforation in the cell partition, the molded material of the partition is deformed slightly as shown in the drawing, Figure 3 at 57. This operation is also preferably carried out before the battery cases are fully age-hardened although this condition is not necessarily a limitation since it is possible to force the connector elements through the apertures even in age-hardened cases. Prior to placing the connector element in position with respect to the partition, it is desirable to coat the cylindrical portion 56 with a suitable acid-resistant compound such as an epoxy resin sealer to assure a good fluid tight seal. In any event, after the connector element 50 is pressed through the partition and the shoulder 54 is abutting the partition, a shaving tool, or other suitable tool, embraces the connector and presses against the shoulder 54 from one side of the partition and deforms, or upsets, the cylindrical portion 56 at the other side of the partition to form a shoulder 60 as shown in Figure 4. When this operation is complete, the connector element 50 is permanently associated with the partition by the upsetting operation and is sealingly engaged thereto in fluid tight relation so that electrolyte cannot pass from one cell to the other through the partition aperture. The sealing compound, if used, aids in making this connection fluid tight.

After the upsetting operation, the battery assembly has reached the stage shown in Figure 5 wherein the battery case includes battery elements 42 with connector straps 44 in each cell compartment and connector elements 50 passing through the several partitions 22 and aligned with connector straps 44 in adjacent cells. In order to electrically connect the connector elements 50 to the connector straps 44, a small mold element 66 may be used which straddles the connector element 50 and rests on the connector strap 44. Molten lead is then poured into this mold 66 and a metallurgical connection is cast which electrically connects the connector element 50 and the connector strap 44. In this connection, the temperature of the lead or lead alloy must be controlled during the pouring operation so as to only superficially melt both the connector strap and connector element and thereby form a good electrical and metallurgical connection. Another means of forming the connector shown in Figure 8 is to provide the straps 44 with a projected and bifurcated saddle 49 so that each end of the connector 50 may be fitted into a saddle 49 during assembly thereof after which the connector is permanently deformed into engagement with the partition wall. Thereafter, the ends of the connector 50 are fused to the strap saddles 49 by resistance heating or lead burning. The two connections made at opposite ends of the battery are preferably made with higher molds to form terminals 65 since these will be used for terminals in the final assembly of the battery. After the connections are cast in place and are solidified, the molds 66 may be removed.

The next step is to place a cover 70 on the case. The cover 70 is formed to include grooved recesses 71 around its outer periphery and connecting grooves 73 connecting the outer groove and aligned with the partitions. All of the grooves 71 and 73 are filled with a suitable acid-resisting sealing compound such as an epoxy resin sealer and the cover 70 is then inverted and pressed into place whereby the sealing compound oozes around the top edges of the case and partitions to seal the case and partitions in fluid tight relation to one another. The two end terminals 65 extend part way into apertures 72 as shown in Figure 6 and, in order to complete the battery, a second mold 74 is placed over the terminal apertures in the battery cover and the full terminal post 76 is cast therein. Here again, the temperature of the lead or lead alloy should be such as to cause superficial melting of the terminal 65 so that a good bond is obtained between the newly cast extension 76 and the post 65 that was previously provided.

The battery assembly is now complete and the cells may be filled with battery acid and the device is ready for charging and forming or, if the cell groups or battery elements were dry-charged, the battery is ready for shipment.

It will be noted that the present method of assembly is different from any prior art methods wherein connector elements pass through the cell partitions. In all of the prior art devices, these connector elements are associated with the partition by means of resilient rubber bushings, nuts and gaskets and other devices, etc., which have never provided a satisfactory fluid tight seal. The temperature changes normally present within a battery during charging and discharging and the vibration to which a battery is normally subjected during use together with the corrosive action of the electrolyte has always caused the assembly to fail after a short period and this condition has always prevented the use of cell connector elements within the cell compartments. The present method of assembly assures permanently sealed cell connectors wherein the upsetting operation creates permanent deformation of the connectors which assure a fluid tight point under any and all conditions of use. Furthermore, since the battery elements or cell groups are permanently associated with the connector elements, the entire battery is made more substantial and less subject to break-down during use.

Another innovation in the present method is the click punching of the cell partitions. Heretofore, these partition apertures have been provided by means of retractable cores in the battery case mold which create many problems that have never been satisfactorily solved as well as making the molds very costly. In order to obviate this condition, proposals have been made wherein the cell partitions have a depression in their top edge through which the cell connector may pass. This expedient has never been satisfactory since it is impossible to seal one cell from the other with respect to the electrolyte when using a depressed top edge. The present method of click punching the partitions is extremely simple and inexpensive and provides a fully satisfactory aperture for the subsequent assembly of the cell connectors thereto.

It is understood that the present invention embraces many deviations from the preferred method, for example, the cell connectors can be upset simultaneously from both sides thereof thereby eliminating the shoulder, although, for practical purposes, the shouldered connector appears to be the design that is most easily assembled to the remainder of the case.

When casting the several electrical connections and terminal posts during the manufacture of the battery, it is preferable to utilize a suitable flux which may be painted on the lead or lead alloy part upon which the casting is to take place. The flux facilitates bonding and improves the strength of bond and is preferably used in all cases although, here again, if accurate temperature controls are maintained, the welds can be made by burning and/or casting as is well known in the art. Fluxes suitable for use in lead welding may be used, one of which is disclosed in application, S.N. 677,803, filed concurrently herewith and assigned to the assignee of the present invention.

While the forms of embodiment of the present invention as herein disclosed constitute preferred forms, it is to be understood that other forms might be adopted.

What is claimed is as follows:

1. In a method for making a storage battery, the steps comprising; providing an open top storage battery case including a partition therein which divides the case into at least two separate compartments, piercing the partition for forming an aperture therethrough spaced from the top thereof, positioning battery elements in each of said compartments, said elements each including a connector strap thereon, passing a connector element through said aperture and in direct contact with the partition, mechanically upsetting the connector element directly against the partition at opposite sides thereof for permanently associating the connector element with the partition and for sealing the connector element with respect to the aperture, and finally attaching the ends of the connector element to the battery straps.

2. In a method for making a storage battery, the steps comprising; providing an open top molded storage battery case including a partition therein which divides the case into at least two separate compartments, punching the partition for forming an aperture therethrough spaced from the top thereof, positioning battery elements in each of said compartments, said elements each including a connector strap thereon, passing a connector element through said aperture and in direct contact with the partition and into position with respect to said battery straps, mechanically upsetting the connector element directly against the partition for permanently associating the connector element with the partition and for sealing the connector element with respect to the aperture, and finally attaching the ends of the connector element to the battery straps.

3. In a method for making a storage battery, the steps comprising; providing an open top molded storage battery case including an integral partition therein which divides the case into at least two separate compartments, punching the partition for forming an aperture therethrough spaced from the top wall thereof, positioning battery elements in each of said compartments, said elements each including a connector strap thereon, forcing a connector element through said aperture and in direct contact with the partition and into position with respect to said battery straps, mechanically deforming the metal in said element so as to clamp directly the element in fluid tight relation to the partition.

4. In a method for making a storage battery, the steps comprising; providing an open top molded storage battery case including a partition therein which divides the case into at least two separate compartments, punching the partition for forming an aperture therethrough spaced from the top wall thereof, positioning battery elements in each of said compartments, said elements each including a connector strap thereon, providing a connector element at least partially coated with an epoxy resin, passing the connector element through said aperture and in direct contact with the partition and into position with respect to said battery straps, mechanically upsetting the connector element directly against the partition for permanently associating the connector element with the partition and for sealing the connector element with respect to the aperture, and finally attaching the ends of the connector element to the battery straps.

5. In a mehod for assembling a storage battery, the steps comprising; providing an open top rubber base storage battery case including a partition therein which divides the case into at least two separate compartments, piercing the partition adjacent the top thereof for forming an aperture therethrough, positioning battery elements in each of said compartments, said battery elements each including a connector strap thereon, passing a connector element through said aperture and in direct contact with the partition wherein the connector element is substantially a drive fit with respect to the aperture, applying simultaneous pressure against portions of the connector element and from opposite sides of the partition for mechanically and permanently deforming the connector element and for associating the connector element directly with the partition in fluid tight relation thereto, and finally metallurgically connecting the ends of the connector element to the battery straps.

References Cited in the file of this patent

UNITED STATES PATENTS

| | | |
|---|---|---|
| 2,002,267 | Kyle | May 21, 1935 |
| 2,066,675 | Dunzweiler | Jan. 5, 1937 |
| 2,221,542 | Hopkins | Nov. 12, 1940 |
| 2,279,317 | Hilger et al. | Apr. 14, 1942 |
| 2,587,185 | Marsh | Feb. 26, 1952 |
| 2,672,497 | Burns et al. | Mar. 16, 1954 |
| 2,745,492 | Brook | May 15, 1956 |

FOREIGN PATENTS

| | | |
|---|---|---|
| 482,948 | Great Britain | Apr. 5, 1938 |